United States Patent
Lee (12)

(10) Patent No.: US 10,959,577 B2
(45) Date of Patent: Mar. 30, 2021

(54) VERTICAL MOVING AND SWING TYPE BLENDER

(71) Applicant: SANG WON CO., LTD., Gyeonggi-do (KR)

(72) Inventor: Hyung Joo Lee, Gyeonggi-do (KR)

(73) Assignee: Sang Won Co., Ltd., Gyeonggi-Do (KR)

( * ) Notice: Subject to any disclaimer, the term of this patent is extended or adjusted under 35 U.S.C. 154(b) by 538 days.

(21) Appl. No.: 15/743,355

(22) PCT Filed: May 23, 2017

(86) PCT No.: PCT/KR2017/005315
§ 371 (c)(1),
(2) Date: Jan. 10, 2018

(87) PCT Pub. No.: WO2018/147507
PCT Pub. Date: Aug. 16, 2018

(65) Prior Publication Data
US 2020/0085240 A1    Mar. 19, 2020

(30) Foreign Application Priority Data

Feb. 13, 2017 (KR) ........................ 10-2017-0019292

(51) Int. Cl.
*A47J 43/046* (2006.01)
*A47J 43/07* (2006.01)
(Continued)

(52) U.S. Cl.
CPC ......... *A47J 43/046* (2013.01); *A47J 43/0722* (2013.01); *B01F 11/0088* (2013.01);
(Continued)

(58) Field of Classification Search
None
See application file for complete search history.

(56) References Cited

U.S. PATENT DOCUMENTS 4,048,473 A * 9/1977 Burkhart ............... A47J 27/004
219/389
4,057,226 A * 11/1977 de Mos ..................... B01F 7/02
366/244

(Continued)

*Primary Examiner* — Ibrahime A Abraham
*Assistant Examiner* — Gyounghyun Bae
(74) *Attorney, Agent, or Firm* — Bay State IP, LLC (57) ABSTRACT

Disclosed is a vertical moving and swing type blender, which is capable of being moved vertically and swinging in right and left directions, thereby easily crushing food. The blender includes: a base member; a turning member configured such that a lower portion thereof is pivotally hinged to an upper portion of the base member; a main body disposed to be vertically movable in the turning member; a container member detachably coupled to an upper portion of the main body and configured to receive food, with a blade provided therein; a vertical elastic member elastically supporting the main body to allow the main body to be vertically movable in the turning member; and a horizontal elastic member configured such that a first end thereof is coupled to the base member and a second end thereof is coupled to the turning member so as to support the turning member horizontally and elastically.

7 Claims, 6 Drawing Sheets

(51) Int. Cl.
*B01F 11/00* (2006.01)
*B01F 13/10* (2006.01)
*B02C 18/12* (2006.01)
*B02C 18/16* (2006.01)

(52) U.S. Cl.
CPC .......... *B01F 13/1041* (2013.01); *B02C 18/12* (2013.01); *B02C 18/16* (2013.01); *B01F 2013/1083* (2013.01); *B01F 2215/0014* (2013.01)

(56) References Cited

U.S. PATENT DOCUMENTS

| | | | | | |
|---|---|---|---|---|---|
| 4,173,925 | A | * | 11/1979 | Leon | A47J 27/14 |
| | | | | | 219/389 |
| 4,301,717 | A | * | 11/1981 | Knees | A47J 27/14 |
| | | | | | 366/185 |
| D281,945 | S | * | 12/1985 | Boyce | D7/378 |
| 5,107,096 | A | * | 4/1992 | Knees | A47J 27/004 |
| | | | | | 219/436 |
| 6,527,433 | B2 | * | 3/2003 | Daniels, Jr. | A47J 43/046 |
| | | | | | 366/205 |
| 6,595,680 | B2 | * | 7/2003 | Sanpei | A47J 43/04 |
| | | | | | 366/147 |
| 7,217,029 | B2 | * | 5/2007 | Grandjean | B01F 7/30 |
| | | | | | 366/224 |
| 7,476,018 | B2 | * | 1/2009 | McGill | A47J 43/046 |
| | | | | | 366/197 |
| 7,717,613 | B1 | * | 5/2010 | Epps | A47J 43/042 |
| | | | | | 366/205 |
| 8,387,520 | B2 | * | 3/2013 | Backus | A47J 19/027 |
| | | | | | 99/512 |
| 10,123,656 | B2 | * | 11/2018 | Shanmugam | B01F 9/0001 |
| 10,842,321 | B2 | * | 11/2020 | Ahn | A47J 43/046 |

* cited by examiner

VERTICAL MOVING AND SWING TYPE BLENDER

CROSS REFERENCE TO RELATED APPLICATION

This application is for entry into the U.S. National Phase under § 371 for International Application No. PCT/KR2017/005315 having an international filing date of May 23, 2017, and from which priority is claimed under all applicable sections of Title 35 of the United States Code including, but not limited to, Sections 120, 363, and 365(c), and which in turn claims priority under 35 USC 119 to Korean Patent Application No. 10-2017-0019292 filed on Feb. 13, 2017.

TECHNICAL FIELD

The present invention relates generally to a vertical moving and swing type blender. More particularly, the present invention relates to a vertical moving and swing type blender, which is capable of being moved vertically and swinging in right and left directions, thereby easily crushing food.

BACKGROUND ART

In general, a blender is configured such that an electric motor is rotated by a power supply, and a blender blade is rotated by the electric motor to mix and/or crush food.

However, since the conventional blender is rotated while the position of the blender blade is fixed, food is placed on the outer periphery of the blender blade due to the centrifugal force of the blender blade after crushing for a certain period of time.

Accordingly, in order to crush less crushed food, a user should hold the blender and shake it or apply impact to move the food placed on the outer periphery of the blender blade toward the blender blade, which is troublesome.

As described above, it is inconvenient for the user to use the conventional blender because the user should hold and shake the entire blender or apply impact to the blender, and accordingly, the blender may be damaged due to the strong impact.

Further, when the food or the like is not crushed well, the motor is sometimes rotated at an extremely high speed, thereby shortening the life of the motor and increasing the electric charge.

DOCUMENTS OF RELATED ART (Patent Document 1) Korean Patent Application Publication No. 10-2016-0097581

DISCLOSURE

Technical Problem

Accordingly, the present invention has been made keeping in mind the above problems occurring in the related art, and the present invention is intended to propose a vertical moving and swing type blender, which is capable of being moved vertically and turned in right and left directions, whereby the food is uniformly mixed and crushed well.

Technical Solution

In order to achieve the above object, according to some aspect of the present invention, there is provided a vertical moving and swing type blender including: a base member; a hollow turning member configured such that a lower portion thereof is pivotally hinged to an upper portion of the base member; a main body disposed to be vertically movable in the turning member; a container member detachably coupled to an upper portion of the main body and configured to receive food therein, with a blade provided therein; a vertical elastic member elastically supporting the main body to allow the main body to be vertically movable in the turning member; and a horizontal elastic member configured such that a first end thereof is coupled to the base member and a second end thereof is coupled to the turning member so as to support the turning member horizontally and elastically, wherein the main body is vertically moved independently with respect to the turning member and is turned in right and left directions along with the turning member, and when the turning member and the main body are leaned to a right or left direction by an external force, the horizontal elastic member restores the turning member and the main body to original positions thereof.

A ball member may protrude from the lower portion of the turning member, the base member may be provided with a ball seat with the ball member pivotally seated therein, whereby the ball member and the ball seat may be engaged with each other such that the turning member is turned in the right and left directions about the ball member.

The vertical elastic member may be constituted by a coil spring and is disposed in the turning member, and the vertical elastic member may be configured such that a lower end thereof is in contact with a lower surface of the turning member and an upper end thereof is in contact with the main body, thereby supporting the main body vertically and elastically.

The turning member may be provided with a long vertical guide groove in an outer circumferential surface thereof, and the main body may be provided with a guide protrusion being vertically moved by being inserted in the guide groove.

The base member may include: a bottom plate with the lower portion of the turning member hinged to a top thereof; and a sidewall protruding upward from the bottom plate and being disposed to surround an outer circumferential surface of the turning member, wherein the horizontal elastic member is configured such that the first end thereof is coupled to the sidewall of the base member and the second end thereof is coupled to the turning member.

The horizontal elastic member may cover a space defined between the sidewall of the base member and the turning member.

The horizontal elastic member may be disposed at a location higher than the sidewall of the base member.

The horizontal elastic member may be disposed in the base member, a covering member may be coupled to the turning member at an upper portion of the horizontal elastic member, and the covering member may be moved along the sidewall of the base member while covering the upper portion of the horizontal elastic member when the turning member is turned in the right and left directions.

Advantageous Effects

According to the vertical moving and swing type blender of the present invention, the following effects can be expected.

Since the container member containing food is moved in right and left directions while being moved in a vertical direction, a user can easily shake the container member in various directions while holding the same, whereby it is possible to easily crush the food in the container member.

Further, by the horizontal elastic member and/or the covering member, the base member is prevented from being exposed to the outside, whereby it is possible to prevent foreign matter from being introduced therein, and it is possible to make the appearance neat.

MODE FOR INVENTION

First Embodiment

Figure 1:
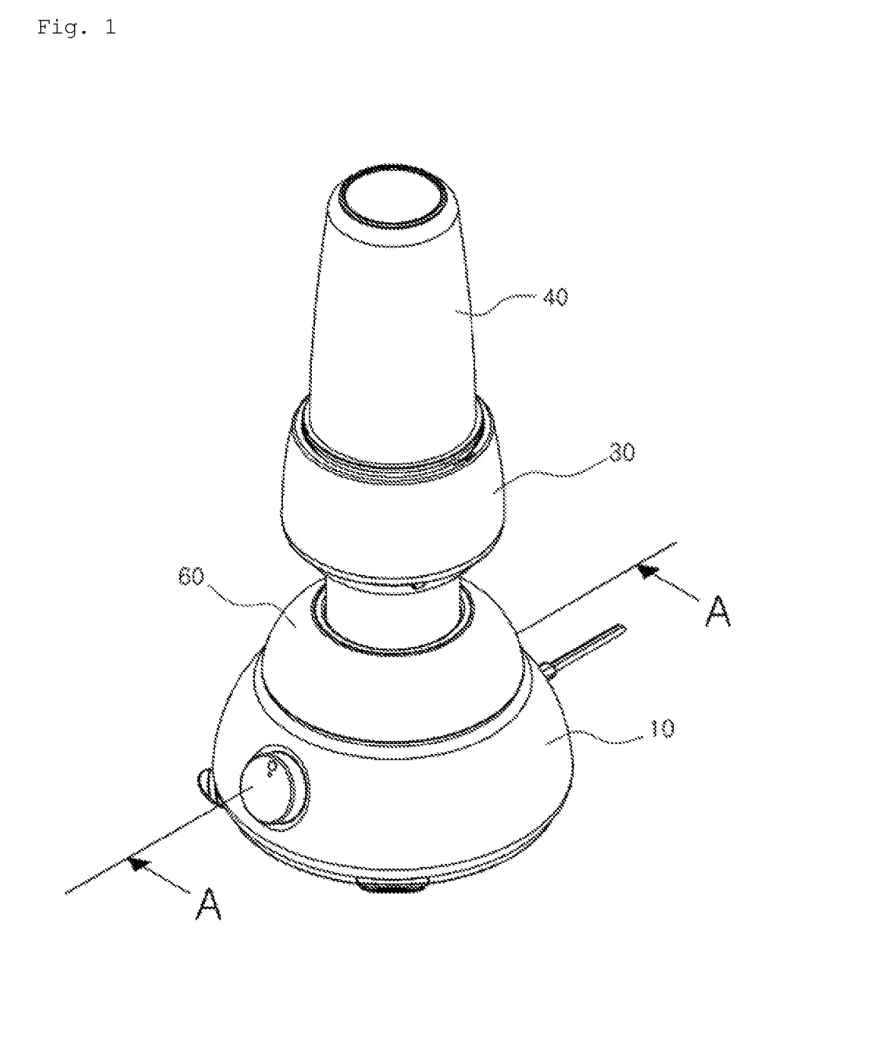
FIG. 1 is a perspective view showing a blender according to a first embodiment of the present invention.
Figure 2:
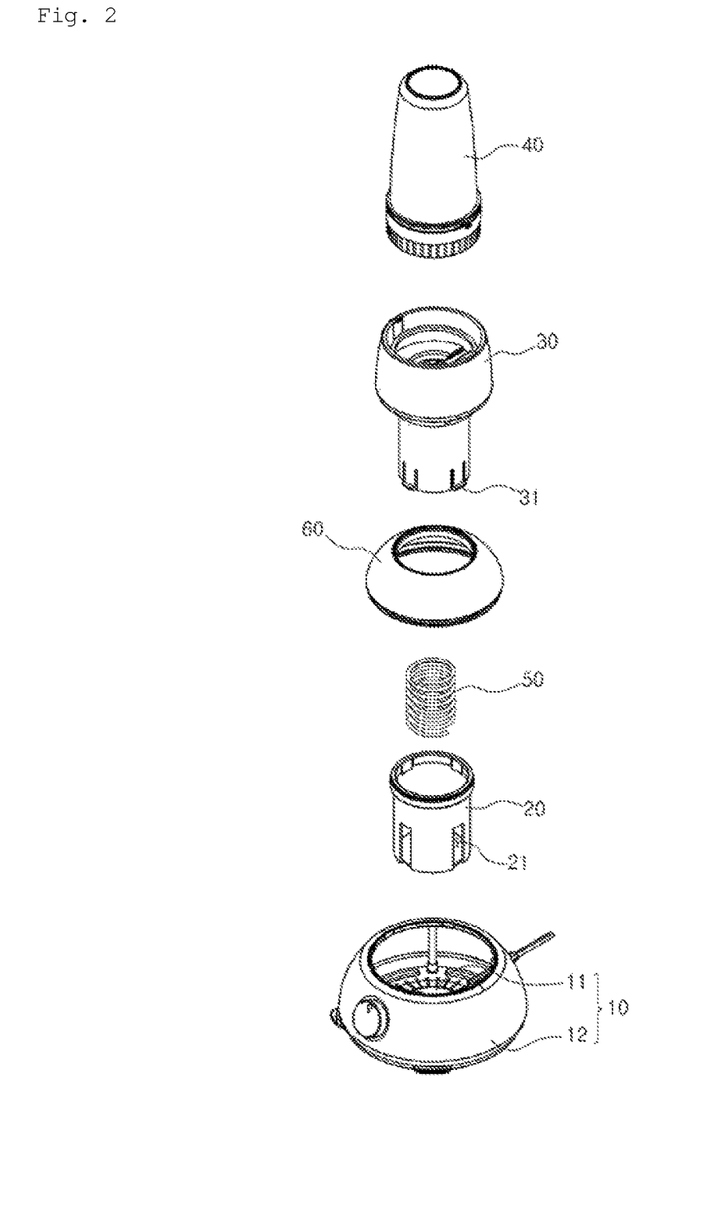
FIG. 2 is an exploded perspective view showing the blender according to the first embodiment of the present invention.
Figure 3:
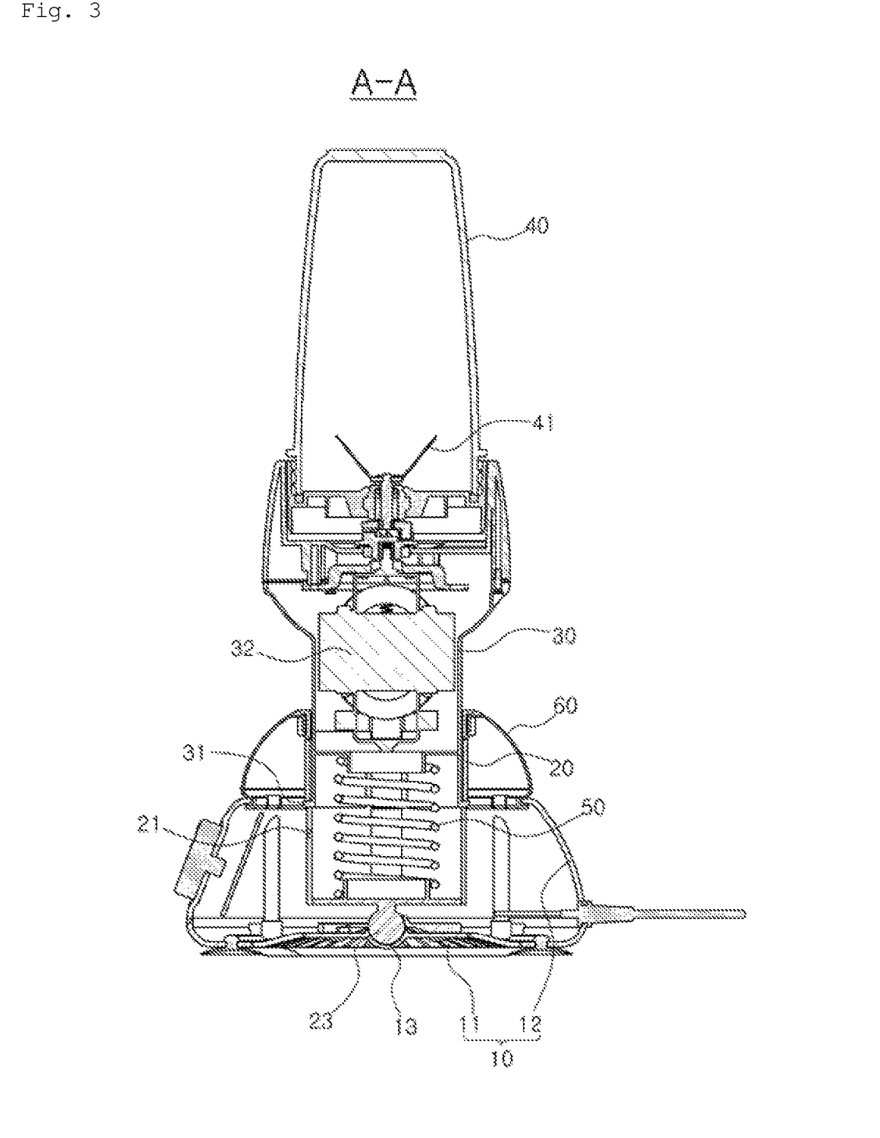
FIG. 3 is a side cross-sectional structural view taken along line A-A of FIG. 1.
Figure 4:
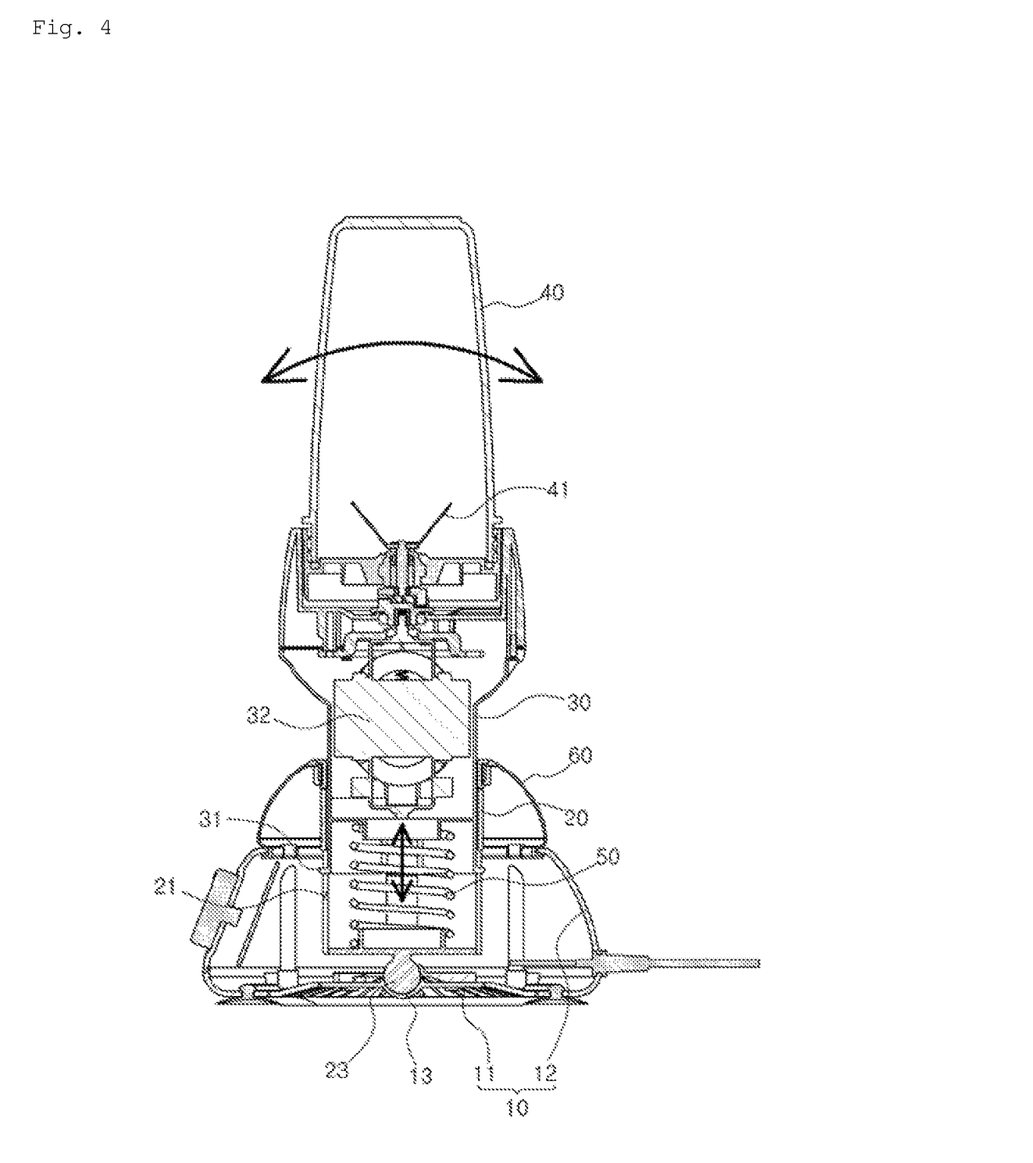
FIG. 4 is an operational view showing the blender according to the first embodiment of the present invention blender-being moved down and turned in right and left directions.

FIG. 1 is a perspective view showing a blender according to a first embodiment of the present invention; FIG. 2 is an exploded perspective view showing the blender according to the first embodiment of the present invention; FIG. 3 is a side cross-sectional structural view taken along line A-A of FIG. 1; and FIG. 4 is an operational view showing the blender according to the first embodiment of the present invention blender-being moved down and turned in right and left directions.

A vertical moving and swing type blender of the present invention includes: a base member 10, a turning member 20, a main body 30, a container member 40, a vertical elastic member 50, and a horizontal elastic member 60.

The base member 10, which is a member to stably support the entire blender with respect to the ground, includes a bottom plate 11 and a sidewall 12.

The bottom plate 11 is formed in a substantially flat plate shape.

The sidewall 12 of the base member protrudes upward from an edge of the bottom plate 11.

By the bottom plate 11 and the sidewall 12 of the base member, a space is defined inside the base member 10.

In some cases, the base member 10 may only include the bottom plate 11 without the sidewall 12.

Various switches and the like are mounted to the outside of the sidewall 12 of the base member, and a wire is coupled to the sidewall to be connected to the outer power supply.

The turning member 20 is formed in a hollow cylindrical shape, and is configured such that a lower portion thereof is hinged to an upper portion of the base member 10 to be turned in right and left directions.

To be more specific, the lower portion of the turning member 20 is hinged to the top of the bottom plate 11.

Accordingly, the turning member 20 is insertedly mounted in the space of the base member 10 inside the sidewall 12, and the sidewall 12 of the base member is disposed to surround an outer circumferential surface of the turning member 20.

Further, a ball member 23 protrudes from the lower portion of the turning member 20, and the base member 10 is provided with a ball seat 13 with the ball member 23 pivotally seated therein, whereby the ball member 23 and the ball seat 13 are engaged with each other to form pivot engagement so that the turning member 20 can be turned about the ball member 23 while swinging in right and left directions.

In some cases, the lower portion of the turning member 20 may be hinged to the base member 10 by a rotation shaft instead of the ball member 23 and the ball seat 13, but in this case, it is possible to perform the turning movement only in the vertical direction of the rotation shaft, not in the left and right directions.

Preferably, as in the embodiment, by the engagement between the ball member 23 and the ball seat 13, the turning member 20 is pivotally mounted to the base member 10, whereby the turning member 20 can be turned about the ball member 23 while swinging in right and left directions with respect to the base member 10.

The main body 30 is disposed to be linearly movable in the vertical direction in the turning member 20.

The main body 30 is configured such that a lower portion thereof is disposed in the turning member 20 and an upper portion thereof protrudes upward.

In the embodiment, a motor 32 is mounted in the main body 30.

The turning member 20 is provided with a long vertical guide groove in an outer circumferential surface thereof, and the main body 30 is provided with a guide protrusion 31 being vertically moved by being inserted in the guide groove 21.

Accordingly, when the main body 30 is moved vertically, the guide protrusion 31 is moved vertically in the guide groove 21.

The container member 40 is detachably coupled to an upper portion of the main body 30.

The container member 40 is configured to receive food therein, and a blade 41 is mounted in the container member to crush the food.

The blade 41 is configured to be rotated by being connected to the motor 32 mounted in the main body 30.

The vertical elastic member 50 elastically supports the main body 30 to be vertically movable in the turning member 20.

In the embodiment, the vertical elastic member 50 is constituted by a coil spring, but not limited thereto, the vertical elastic member 50 may be constituted by various parts having elasticity.

The vertical elastic member 50 constituted by the coil spring is disposed in the turning member 20, and is configured such that a lower end thereof is in contact with a lower surface of the turning member 20 and an upper end thereof is in contact with the main body 30, thereby supporting the main body 30 vertically and elastically.

Accordingly, when the main body 30 is moved vertically by an external force, the vertical elastic member is compressed or released such that the main body 30 is semi-automatically moved vertically with ease.

The horizontal elastic member 60 is configured such that a first end thereof is coupled to the base member 10 and a second end thereof is coupled to the turning member 20, thereby elastically supporting the turning member 20 when it swings in right and left directions.

To be more specific, the horizontal elastic member 60 is made of silicone, rubber, or the like, and is configured such that the first end thereof is coupled to the sidewall 12 of the base member and the second end thereof is coupled to the turning member 20.

Here, the horizontal elastic member 60 fully covers a space defined between the sidewall 12 of the base member and the turning member 20 so as to prevent foreign matter from being introduced therein.

The horizontal elastic member 60 may be made of various materials providing elasticity in right and left directions, without being limited to silicone or rubber.

Further, the horizontal elastic member may partially cover the space defined between the sidewall 12 of the base member and the turning member 20.

When the turning member 20 is leaned to the right or left direction by an external force, the horizontal elastic member 60 is compressed and released to allow the turning member 20 to be restored to its original position when the external force is removed.

The horizontal elastic member 60 is coupled to the sidewall 12 of the base member and the turning member 20 in the state where it is disposed at a location higher than the sidewall 12.

Thanks to the above described configuration, the main body 30 with the container member 40 coupled thereto is vertically moved independently with respect to the turning member 20, and is turned in right and left directions along with the turning member 20 while swinging.

Further, when the turning member 20 and the main body 30 are leaned to the right or left direction by an external force, the horizontal elastic member 60 generates a force that restores the turning member 20 and the main body 30 to their original positions.

Hereinbelow, description will be made to the operation of the present invention configured as described above.

Firstly, food is put in the container member 40, and the container member 40 is coupled to the upper portion of the main body 30.

Here, the blade 41 is connected to the motor 32.

As power is applied and the motor 32 is driven, the blade 41 is rotated to crush the food in the container member 40.

In this state, a user presses down the container member 40 or the main body 30 while holding the same.

Then, the main body 30 is moved down with respect to the turning member 20 to compress the vertical elastic member 50, and when the external force becomes weak or is removed, the turning member 20 is moved up again by the restoring force of the vertical elastic member 50.

By the vertical movement of the turning member 20, the food in the container member 40 is easily crushed.

In particular, while holding the main body 30, the user can shake it in the right and left directions as well as in the vertical direction, so that the food in the container member 40 can be well mixed and be easily crushed.

When the main body 30 is held and moved in right and left directions, the main body 30 and the turning member 20 are turned while swinging in right and left directions about the ball member 23. Here, the horizontal elastic member 60 is compressed or released according to the positions.

When the external force becomes weak or is removed, the main body 30 and the turning member 20 are restored to their original positions by the restoring force of the horizontal elastic member 60.

As described above, since the present invention is configured such that the container member 40 with food contained therein is moved in the vertical direction and in the right and left directions, the user can easily shake the container member 40 in various directions while holding the same, whereby it is possible to easily crush the food in the container member 40.

Second Embodiment

Figure 5:
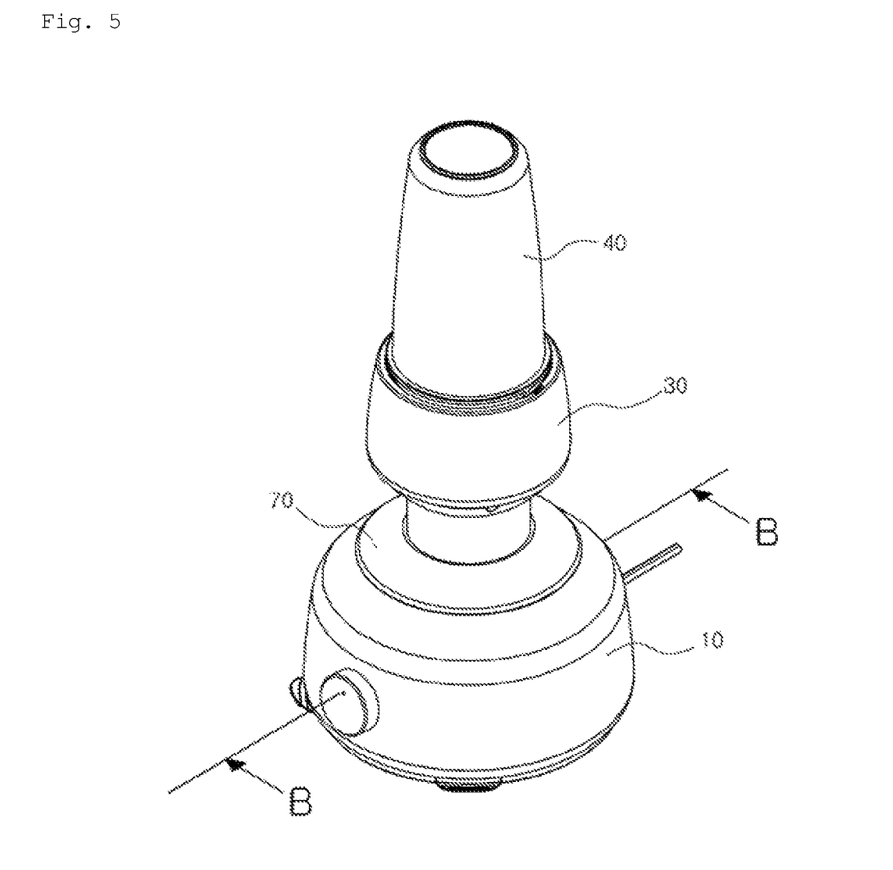
FIG. 5 is a perspective view showing the blender according to a second embodiment of the present invention.
Figure 6:
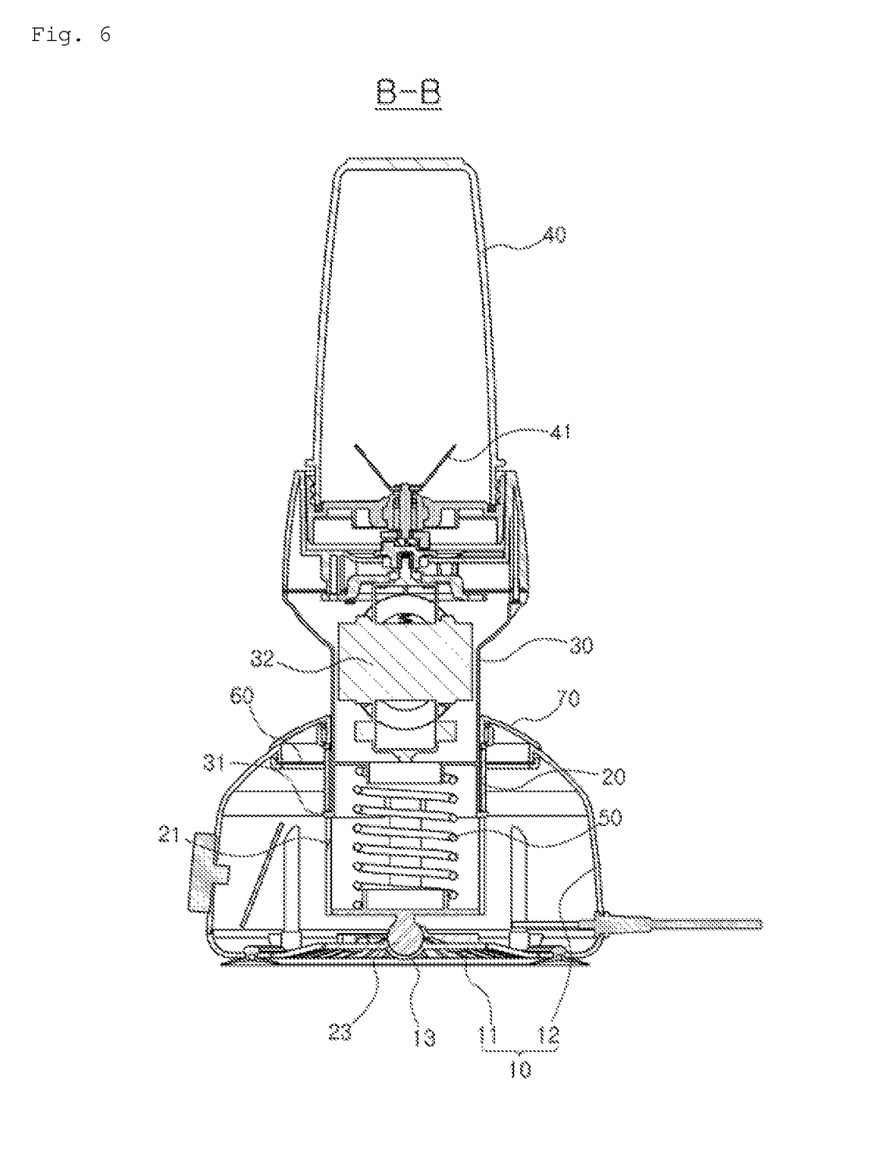
FIG. 6 is a side cross-sectional structural view taken along line B-B of FIG. 5.

FIG. 5 is a perspective view showing the blender according to a second embodiment of the present invention; and FIG. 6 is a side cross-sectional structural view taken along line B-B of FIG. 5.

The second embodiment differs from the first embodiment in that the position of the horizontal elastic member 60 is different, and the second embodiment includes a covering member 70, and description will be made mainly to this point.

The horizontal elastic member 60 is disposed in the base member 10, and the first end thereof is coupled to the sidewall 12 of the base member and the second end thereof is coupled to the outer circumferential surface of the turning member 20.

Accordingly, when the turning member 20 is moved in the right and left directions, the horizontal elastic member 60 is compressed or released such that the turning member 20 is restored to its original position.

Further, the covering member 70 is coupled to the outer circumferential surface of the turning member 20 and covers the upper portion of the horizontal elastic member 60.

The covering member 70 is formed in a substantially hollow conical shape, and is configured to cover the upper portion of the horizontal elastic member 60 and to be moved along the outer circumferential surface of the sidewall 12 of the base member when the turning member 20 is moved in the right and left directions.

Other details are the same as those of the first embodiment, and a detailed description thereof will be omitted.

Although reference to the embodiments has allowed the present invention to be described in more detail, it should be understood that the present invention is not limited to the embodiments but may be variously changed without departing from the technical idea of the present invention.

[Description of reference characters of important parts]

| | | |
|---|---|---|
| 10: base member | 11: bottom plate | 12: sidewall |
| 13: ball seat | | |
| 20: turning member | 21: guide groove | 23: ball member |
| 30: main body | 31: guide protrusion | 32: motor |
| 40: container member | 41: blade | |
| 50: vertical elastic member | | |
| 60: horizontal elastic member | | |
| 70: covering member | | |

The invention claimed is:

1. A vertically moving and swinging type blender comprising:
   a base;
   a hollow turning member comprising a ball member on a lower portion thereof configured for the lower portion to be pivotally hinged to an upper portion of the base;
   a main body disposed to be vertically movable in the hollow turning member;
   a container detachably coupled to an upper portion of the main body and configured to receive food therein, with a blade provided therein;
   a vertically elastic member elastically supporting the main body to allow the main body to be vertically movable in the hollow turning member; and a horizontally elastic member made of silicone or rubber configured for a first end of the horizontally elastic member to be coupled to the base and a second end of the horizontally elastic member is coupled to the hollow turning member to support the hollow turning member horizontally and elastically, wherein the main body is vertically moved independently with respect to the hollow turning member and is turned toward right and left directions perpendicular to the hollow turning member, the vertically elastic member is constituted by a coil spring and is disposed in the hollow turning member, and a lower end of the vertical elastic member is in contact with a lower surface of the hollow turning member and an upper end of the vertical elastic member is in contact with the main body, thereby supporting the main body vertically and elastically; and when the hollow turning member and the main body are leaned to a right or left direction by an external force, the horizontal elastic member restores the hollow turning member and the main body to original positions when the external force is removed.

2. The blender of claim 1, wherein the ball member protrudes from the lower portion of the hollow turning member, the base is provided with a ball seat coupled with the ball member pivotally seated therein, and whereby the ball member and the ball seat are engaged with each other such that the hollow turning member is turned toward the right and left directions about the ball member.

3. The blender of claim 1, wherein the hollow turning member is provided with a long vertical guide groove on an outer circumferential surface thereof, and the main body is provided with a guide protrusion moving vertically when inserted in the guide groove.

4. The blender of claim 1, wherein the base includes:

a bottom plate coupled with the lower portion of the hollow turning member and the lower portion of the hollow turning member hinged to a top surface of the bottom plate; and a sidewall protruding upward from the bottom plate and being disposed to surround an outer circumferential surface of the hollow turning member, wherein the first end of the horizontally elastic member is coupled with the sidewall of the base and the second end of the horizontally elastic member is coupled with the hollow turning member.

5. The blender of claim 4, wherein the horizontally elastic member covers a space defined between the sidewall of the base and the hollow turning member.

6. The blender of claim 5, wherein the horizontally elastic member is disposed at a location higher than the sidewall of the base.

7. The blender of claim 5, wherein the horizontally elastic member is disposed in the base, a covering member is coupled to the hollow turning member at an upper portion of the horizontally elastic member, and the covering member is moved along the sidewall of the base while covering the upper portion of the horizontally elastic member when the hollow turning member is turned toward the right and left directions.

* * * * *